United States Patent [19]

Brubakken

[11] 4,377,875
[45] Mar. 29, 1983

[54] SELF-CONTAINED BATHROOM UNIT

[76] Inventor: Gardner G. Brubakken, 314 Second St., Two Harbors, Minn. 55616

[21] Appl. No.: 255,885

[22] Filed: Apr. 20, 1981

[51] Int. Cl.³ .............................................. E03D 1/00
[52] U.S. Cl. ......................................... 4/665; 4/321; 4/664
[58] Field of Search .................. 4/664, 665, 329, 331, 4/353, 355, 363, 395, 319, 321, 322, 323, 638, 603, 312, 252; 417/40; D23/49, 50

[56] References Cited

U.S. PATENT DOCUMENTS

| D. 110,643 | 7/1938 | Mahlum | 4/192 X |
|---|---|---|---|
| 1,556,565 | 10/1925 | Walsh | 4/665 |
| 2,718,012 | 9/1955 | Howe | 4/319 |
| 3,005,068 | 10/1961 | Pollak | 417/40 |
| 3,124,808 | 3/1964 | Tiller | 4/664 |
| 3,131,637 | 5/1964 | Jennings | 417/40 |
| 3,582,995 | 6/1971 | Enenstein | 4/664 |

Primary Examiner—Stephen Marcus
Assistant Examiner—Kenneth S. Putnam

[57] ABSTRACT

A self-contained bathroom unit including a rigid L-shaped tank enclosure and a toilet attached thereto, the enclosure having a sewage ejector pump located therein and float level detection mechanism for actuating the sewage ejector pump, and attachable basin mounting mechanism, and connections for water inlets, sewage outlets, vents and attachment to other appliances.

10 Claims, 4 Drawing Figures

SELF-CONTAINED BATHROOM UNIT

BACKGROUND OF THE INVENTION

The present invention relates to self-contained bathroom units, and particularly to bathroom units which may be conveniently installed in either new or preexisting building structures, at or above floor level, and above or below sewage drain facilities.

It is well-known to construct bathroom facilities in prefabricated form as a unitary assembly; example may be found in U.S. Pat. No. 3,005,205, wherein there is described a unitary washroom including the exterior washroom walls, plumbing fixtures and storage reservoir assembled as a single prefabricated unit. Further example may be found in U.S. Pat. No. 3,183,525 wherein it is disclosed to construct a toilet system for a fallout shelter; such toilet system including a box-like tank for the temporary storage of sewage. Further example may be found in U.S. Pat. No. 3,582,995, wherein it is disclosed a prefabricated toilet and vanity sump arrangement having a toilet fixture and vanity attached to a rigid box-like structure which forms a shallow reservoir for the storage of sewage and waste water. Such inventions represent structures of various forms for providing bathroom fixtures coupled to a sewage storage reservoir or holding tank in a unitary assembly.

The need for such structures may be as a result of special construction requirements as in remodeling, special use requirements as in fallout shelters, special economic considerations as in prefabricated bathrooms, or considerations of the environment and available external facilities, as in the case of bathrooms positioned below the grade level of existing sewer facilities. Depending upon these and other particular considerations, one or more structural forms may be better adaptable as a solution to particular problems. In meeting the varying requirements of any particular situation it is desirable to provide not only a bathroom unit which may be adapted to the varying requirements, but also one that may be completely functional and aesthetically attractive, and one which may be adapted to the particular decorating and structural limitations at the location where the unit is to be installed.

SUMMARY OF THE INVENTION

The present invention provides a completely adaptable self-contained bathroom unit for many of the applications and special considerations described herein. A generally L-shaped and rigid tank forms the functional and structural base for a self-contained bathroom unit. The tank includes a large reservoir for the storage of sewage and waste liquids, and completely houses a sewage pump and control mechanism for actuating the pump, and plumbing lines for water, sewage collection and disposal, and venting. Further, the tank provides a support base for attachment of other bathroom fixtures as well as providing a collection tank for waste material from these fixtures.

The self-contained bathroom unit described herein may be installed in preexisting structures by merely setting it on floor level, or by recessing it partially into the floor, and in either event the height of all of the bathroom fixtures forming a part of the unit or attached thereto may be readily adjusted to the normal height acceptable for such fixtures. Further, once installed, the self-contained bathroom unit may be easily incorporated into the decorating scheme preferred for the room in which it is installed.

It is therefore a principal object of the present invention to provide a self-contained bathroom unit for installation in new or preexisting structures to accommodate any structural limitation which may exist.

It is another object of the present invention to provide a self-contained bathroom unit in which the height of all bathroom fixtures may be made conventional for fixtures of the type disclosed.

It is yet another object of the present invention to provide a self-contained bathroom unit which may be amenable to the decorating scheme for the room in which it is installed.

BRIEF DESCRIPTION OF THE DRAWINGS

A preferred embodiment of the invention is described herein, and with reference to the drawings, in which.

DESCRIPTION OF THE PREFERRED EMBODIMENT

Figure 1:
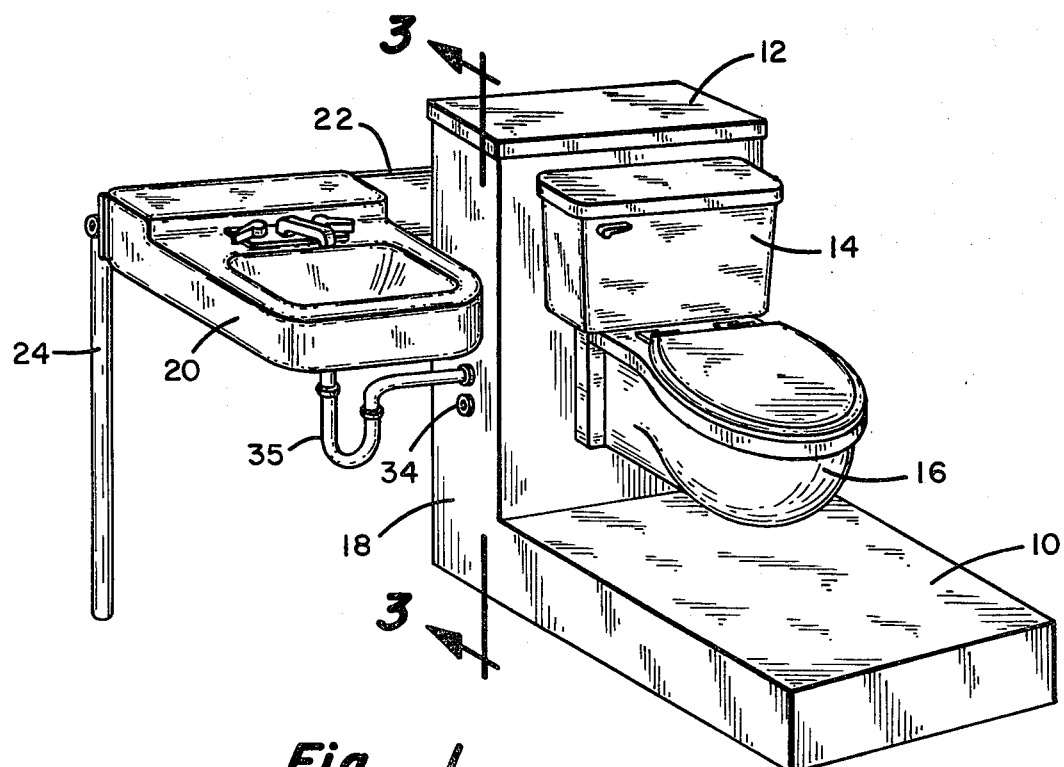
FIG. 1 is an isometric view of the invention.

Referring first to FIG. 1 there is shown in isometric view the preferred embodiment of the invention. A generally L-shaped tank and enclosure 10 forms the base and support structure for the features described hereinafter. Tank and enclosure 10 is preferably constructed of steel or other rigid material, having a hollow interior. Except for the openings to be described hereinafter for the passage of liquid and sewage wastes, tank 10 is totally enclosed on all sides but one. A cover 12 is sealably fitted over the single open end of the tank 10 for providing access to the interior of tank and enclosure 10. Cover 12 is preferably fitted with a gasket or other sealing arrangement so as to provide an airtight seal against tank and enclosure 10.

A wall-mount toilet fixture comprising a tank 14 and a bowl 16 are bolted against a vertical wall 18 of tank and enclosure 10. Such wall-mount toilet fixtures have inherent advantages over floor-mount toilet fixtures in that they are more sanitary and easier to clean, and the novel construction of the invention enables such fixtures to be conveneiently used.

Figure 2:
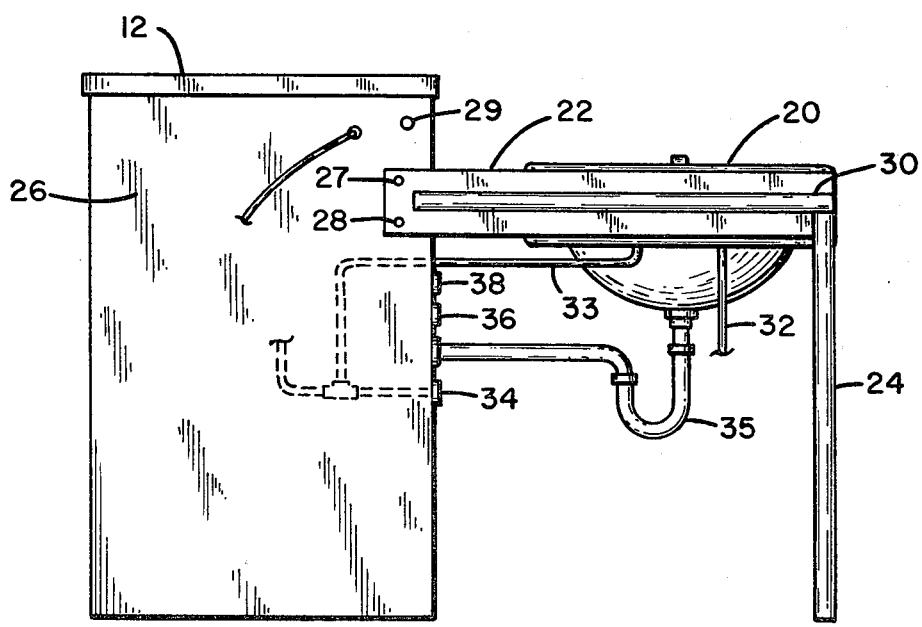
FIG. 2 is a rear elevation view of the invention.

A basin 20 is bolted to a plate 22 which is supported against the rear side of tank and enclosure 10. Leg 24 supports the outer end of plate 22. FIG. 2 shows a rear view of the invention wherein it can be seen that plate 22 is supported against the rear surface 26 by means of bolts 27 and 28. A third bolt hole 29 is spaced an equal distance from bolt 27, so that plate 22 may also be attached against surface 26 by means of bolts at 27 and 29. Of course, for this latter connection leg 24 must be extended. A support pipe 30 is welded across the rear side of plate 22 to improve rigidity of plate 22.

Basin 20 has a hot water inlet pipe 32 and a cold water inlet pipe 33, both of which may be connected to the structure's water supply. Cold water pipe 33 may be connected via a common cold water tap at 34, to enable a cold water inlet into tank and enclosure 10 for purposes of operating the toilet and other fixtures which may be attached thereto. Basin 20 also has a drain pipe 35 which is connected into tank and enclosure 10. A sewage outlet 36 and a vent outlet 38 is also provided through the side of tank and enclosure 10.

Figure 3:
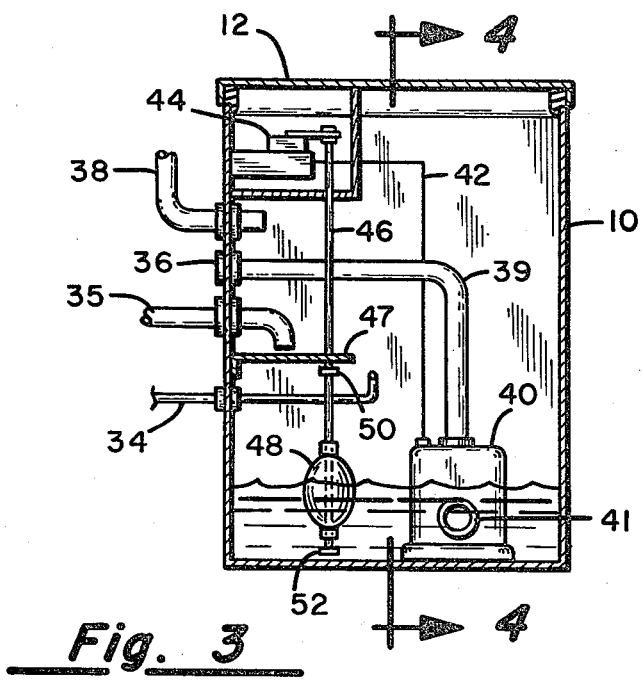
FIG. 3 is a view taken along the lines 3—3 of FIG. 1.

FIG. 3 shows a view taken along the lines 3—3 of FIG. 1, wherein the components inside of tank and enclosure 10 are illustrated. Sewage outlet 36 is connected via a pipe 39 to a sewage pump 40. Sewage pump 40 is actuated by means of an electrical signal over line 42, which is energized by a switch 44. Switch 44 is connected to a rod 46 which extends downwardly through a guide 47 and a float 48. Rod 46 has an upper stop 50 attached thereto, and a lower stop 52 similarly attached. The stops 50 and 52 are positioned on either side of float 48 at a spaced apart distance. When float 48 moves into contact with stop 50 it causes rod 46 to raise up, thereby actuating switch 44 and energizing sewage pump 40. When float 48 moves downwardly into contact with stop 52, it causes rod 46 to move downwardly thereby deactuating switch 44 and deenergizing sewage pump 40. Float 48 has a watertight sleeve passing through its entire internal length, and rod 46 is sized smaller than the sleeve to permit float 48 to freely move upwardly and downwardly along rod 46.

Figure 4:
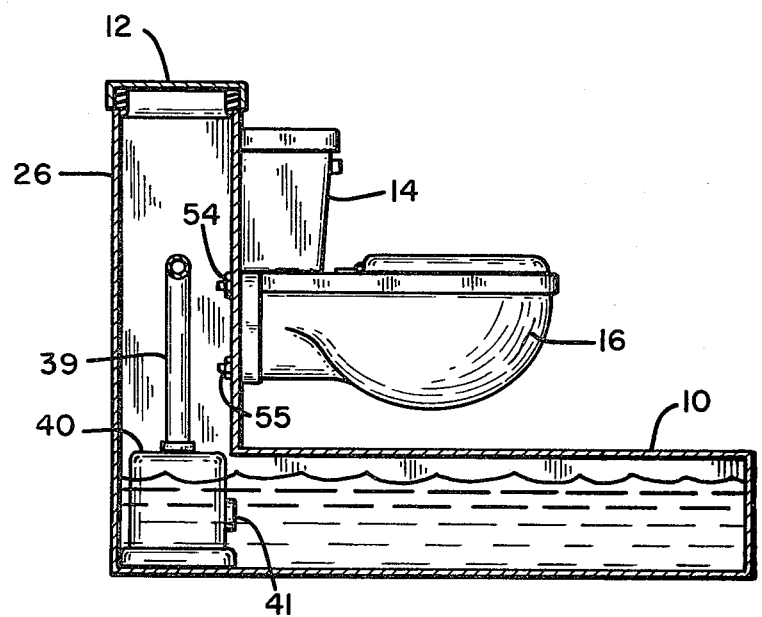
FIG. 4 is a view taken along the lines 4—4 of FIG. 3.

FIG. 4 shows a cross-sectional side view taken along the lines 4—4 of FIG. 3. Toilet bowl 16 is bolted against the vertical wall 18 of tank and enclosure 10 by bolts at 54 and 55. In this manner, vertical wall 18 forms a completely rigid support structure for toilet bowl 16 and tank 14. Pump 40 is positioned along the interior lower floor of tank and enclosure 10, and has a pump intake 41 positioned near the bottom of the tank.

In operation, tank and enclosure 10 may be installed by merely resting it on a floor surface, or it may be recessed into a floor so that the top surface of the lower tank portion is flush with the floor level. In either event, the exterior surface of tank 10 may be covered with carpeting or other floor covering materials, or may be covered with ceramic tile. Alternatively, portions of tank and enclosure 10 may be tiled and other portions may be covered with other floor covering materials. If tank and enclosure 10 is recessed into a floor, plate 22 may be attached against rear surface 26 by bolts placed at locations 27 and 29. Alternatively, if tank and enclosure 10 is merely set atop a floor surface, plate 22 may be attached at locations 27 and 28. In either event, the height of basin 20 may be selected so as to maintain it at a nominal 29-30 inches above floor level. It should be noted that bolts and bolt holes may be provided along either edge of plate 22 so as to permit the attachment of plate 22 on either side of tank and enclosure 10.

After tank and enclosure 10 has been located in a preferred location in a room, the water and sewage connections are made to the appropriate tank connecting points. A vent pipe 38 may be connected to an external vent, or in proper circumstances may be merely vented within the room wherein the unit is located. The electrical connections necessary to operate pump 40 may be obtained by merely plugging a cord into a wall outlet.

In use, the bottom of tank and enclosure 10 gradually becomes filled with liquids and sewage materials until float 48 is raised to a level wherein it contacts stop 50. At this point, stop 50 urges rod 46 upwardly to actuate switch 44 and thereby energize pump 40. Pump 40 operates to pump the collected material from the bottom of the tank to an appropriate sewage disposal site, and at such time as the level of liquid and sewage in the bottom of tank 10 recedes, float 48 engages against stop 52 and causes rod 46 to move downwardly. This downward movement deactuates switch 44 and deenergizes pump 40. The cycle may be repeated at regular intervals as the self-contained bathroom unit is used. The size of tank 10 is preferably large enough to hold forty or more gallons of liquid and other sewage so that material may be collected for a period of time before pump 40 becomes actuated.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A self-contained and free standing bathroom unit, comprising:
    (a) a generally L-shaped enclosure having a hollowed interior and a vertical leg and a horizontal leg said horizontal leg projecting a substantial distance in front of said vertical leg, and an open end at the top of said vertical leg, said enclosure having respective side walls formed of a rigid, one-piece L-shaped sheet and having rigid sheets sealably formed about the horizontal extensions of said L-shaped sheets to construct said horizontal let, and having rigid vertical side walls sealably formed about the vertical extensions of said L-shaped sheets to construct said vertical leg;
    (b) a commode attached to a vertical wall of said enclosure, said commode being spaced above and projecting over the horizontal leg;
    (c) a sewage pump located inside said enclosure;
    (d) a float and actuator mechanism located in the vertical leg of said enclosure, said actuator mechanism controllably activating said sewage pump; and
    (e) a cover removably and sealably fitting over said open end at the top of said vertical leg.

2. The apparatus of claim 1, further comprising a plate attachable to said enclosure, said plate extending horizontally from said enclosure and having a leg at the distal end thereof.

3. The apparatus of claim 1, wherein said float and actuator mechanism further comprises a switch attached to a vertical rod and a float slidable along said rod.

4. The apparatus of claim 3, further comprising two stop members attached to said rod at spaced apart positions, one on either side of said float.

5. The apparatus of claim 4, wherein said float further comprises a thin-walled shell having a tube passing therethrough, the interior of said shell being watertight.

6. The apparatus of claim 2, further comprising a basin attached to said horizontal plate, said basin projecting in the same direction as said horizontal leg.

7. The apparatus of claim 6, further comprising a drain attached to said basin and opening into said enclosure interior.

8. The apparatus of claim 7, further comprising a vent opening through a wall of said enclosure.

9. The apparatus of claim 8, further comprising a sewage pipe connected to said sewage pump and projecting through a wall of said enclosure.

10. The apparatus of claim 9, further comprising additional openings through said enclosure for connection to bathroom fixtures.

* * * * *